(12) United States Patent
Bech

(10) Patent No.: US 9,469,055 B2
(45) Date of Patent: Oct. 18, 2016

(54) CURING COMPOSITE MATERIALS COMPRISING LATENT-CURE RESINS

(71) Applicant: Vestas Wind Systems A/S, Aarhus N. (DK)

(72) Inventor: Anton Bech, Ringkøbing (DK)

(73) Assignee: Vestas Wind Systems A/S, Aarhus N. (DK)

( * ) Notice: Subject to any disclaimer, the term of this patent is extended or adjusted under 35 U.S.C. 154(b) by 148 days.

(21) Appl. No.: 14/360,199

(22) PCT Filed: Nov. 14, 2012

(86) PCT No.: PCT/DK2012/050416
§ 371 (c)(1),
(2) Date: May 22, 2014

(87) PCT Pub. No.: WO2013/075716
PCT Pub. Date: May 30, 2013

(65) Prior Publication Data
US 2015/0091222 A1    Apr. 2, 2015

Related U.S. Application Data

(60) Provisional application No. 61/563,561, filed on Nov. 24, 2011.

(30) Foreign Application Priority Data

Nov. 23, 2011    (DK) .................................. 2011 70641
Nov. 24, 2011    (DK) .................................. 2011 70645

(51) Int. Cl.
*B29C 35/02*    (2006.01)
*C08J 3/24*    (2006.01)
(Continued)

(52) U.S. Cl.
CPC ........... *B29C 35/02* (2013.01); *B29C 35/0266* (2013.01); *B29D 99/0025* (2013.01);
(Continued)

(58) Field of Classification Search
None
See application file for complete search history.

(56) References Cited

U.S. PATENT DOCUMENTS 6,117,376 A     9/2000  Merkel
9,073,270 B2 *  7/2015  Bech ...................... B29B 11/16
(Continued)

FOREIGN PATENT DOCUMENTS

GB     842111 A     7/1960
GB    2445929 A     7/2008
(Continued)

OTHER PUBLICATIONS

International Searching Authority, International Search Report and Written Opinion issued in corresponding PCT Application No. PCT/DK2012/050416 dated Feb. 14, 2013, 10 pages.
(Continued)

*Primary Examiner* — Monica Huson
(74) *Attorney, Agent, or Firm* — Wood Herron & Evans LLP

(57) ABSTRACT

The invention relates to a method for curing of a composite material. The method involves applying heat to only a first region of said composite material, such that said first region is heated to a temperature above the cure onset temperature of said curable resin, thus initiating curing of said curable resin in said first region; and maintaining the composite material in an insulated state, such that the curing of said curable resin spreads to regions of the composite material outside of said first region.

16 Claims, 5 Drawing Sheets

Figure 1:
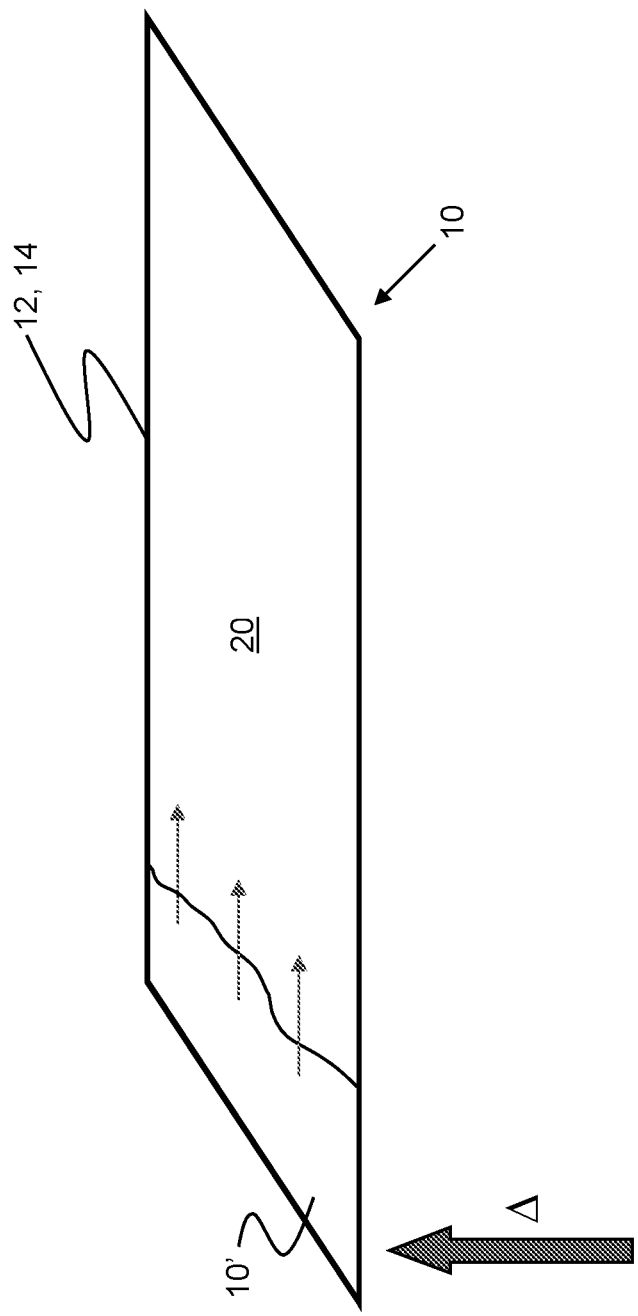

(51) Int. Cl.
*B29D 99/00* (2010.01)
*B29C 35/08* (2006.01)
*B29K 101/10* (2006.01)
*B29K 307/04* (2006.01)

(52) U.S. Cl.
CPC ............... *C08J 3/244* (2013.01); *C08J 3/247* (2013.01); *B29C 2035/0822* (2013.01); *B29K 2101/10* (2013.01); *B29K 2307/04* (2013.01); *C08J 2300/24* (2013.01); *C08J 2361/06* (2013.01); *C08J 2363/00* (2013.01); *C08J 2367/06* (2013.01); *C08J 2379/04* (2013.01); *C08J 2379/08* (2013.01)

(56) References Cited

U.S. PATENT DOCUMENTS

2010/0099805 A1 4/2010 Okuhira et al.
2011/0229720 A1 9/2011 Matsen et al.

FOREIGN PATENT DOCUMENTS

JP     S6063267 A     4/1985
WO    2010066050 A1    6/2010

OTHER PUBLICATIONS

Danish Patent and Trademark Office, Combined search and examination report issued in corresponding DK application No. PA 2011 70641 dated Jul. 3, 2012, 4 pages.
Danish Patent and Trademark Office, Combined search and examination report issued in corresponding DK application No. PA 2011 70645 dated Jul. 6, 2012, 4 pages.
International Bureau, Notification Concerning Transmittal of International Preliminary Report on Patentability, issued in corresponding International Application No. PCT/DK2012/050416, dated May 27, 2014, 6 pages.

\* cited by examiner

CURING COMPOSITE MATERIALS COMPRISING LATENT-CURE RESINS

FIELD OF THE INVENTION

The present invention relates to a method for curing a composite material. The method allows efficient curing without the disadvantages associated with overheating.

BACKGROUND OF THE INVENTION

Curable resins which are reinforced with fibrous materials (composite materials) are commonly-used components in the automobile, wind turbine and aerospace industries. Such materials are light-weight, easy to mould and have good mechanical properties.

Curing of curable resins involves polymerisation and cross-linking reactions between the resin components, and is a generally exothermic process. During moulding of composite materials, curing is initiated by heating the composite material to above its cure onset temperature. So-called "latent" resins have cure onset temperatures which are above ambient temperature, so that they can be safely stored and handled without curing being initiated.

Curing of thick composite materials is particularly troublesome as the enthalpy of the curable resin builds up heat through the cure cycle. This heat has difficulty being dissipated out of the composite material during the reaction, meaning that high peak temperatures are reached during the cure.

For thick composite materials, such as glass or carbon fibre prepregs, the reaction energy of the prepreg is in the order of 100 J/g and this energy can give a temperature rise of approximately 100K on top of the temperature at cure onset temperature. For typical 120° C. curing prepregs the cure onset temperature is approximately 80° C. Such materials will see peak temperatures of up to 180° C. if the cure is done adiabatically. In thick composite materials, the exothermic energy produced by the curing reaction will raise the material core temperature to high levels, as the energy cannot be conducted to the surfaces to be dissipated.

Among other things, the high temperatures produced in composite materials due to the exothermic resin curing may cause thermal stress in moulding tools and thermal distortion in the moulded articles themselves.

There is therefore a need to provide curing of composite materials in a controlled manner, without generation of high peak temperatures.

SUMMARY OF THE INVENTION

It has been found by the present inventor(s) that high peak temperatures in the curing resins of composite materials can be avoided, or reduced, by selectively applying heat to only a first region of a composite material, and allowing the heat generated by the exothermic curing reaction to spread and initiate cure in other areas of the composite material.

The present invention therefore relates to a method for curing of a composite material 10, said method comprising;
 a. providing a composite material 10 comprising at least one layer 12, 14 of fibrous material and curable resin 20;
 b. applying heat to only a first region 10' of said composite material 10, such that said first region 10' is heated to a temperature above the cure onset temperature of said curable resin 20, thus initiating curing of said curable resin 20 in said first region 10';
 c. maintaining the composite material 10 in an insulated state, such that the curing of said curable resin 20 spreads to regions of the composite material 10 outside of said first region 10'.

The invention also provides a method for the manufacture of a formed article 100, said method comprising steps a. b. and c. above, said method further comprising the step of moulding the composite material 10 according to the desired form of said formed article 100.

Further aspects and embodiments of the invention will become apparent from the following detailed description and the dependent claims.

LEGENDS TO THE FIGURES

Figure 2:
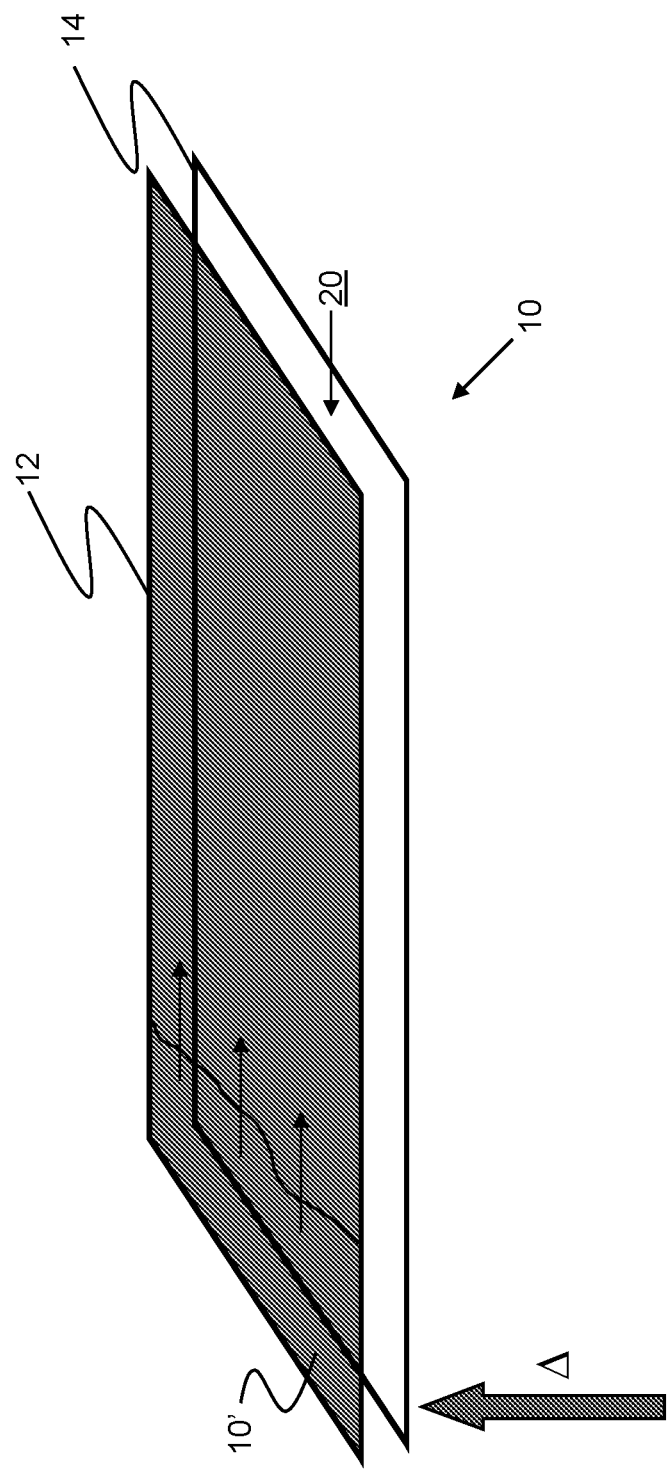
Figure 3:
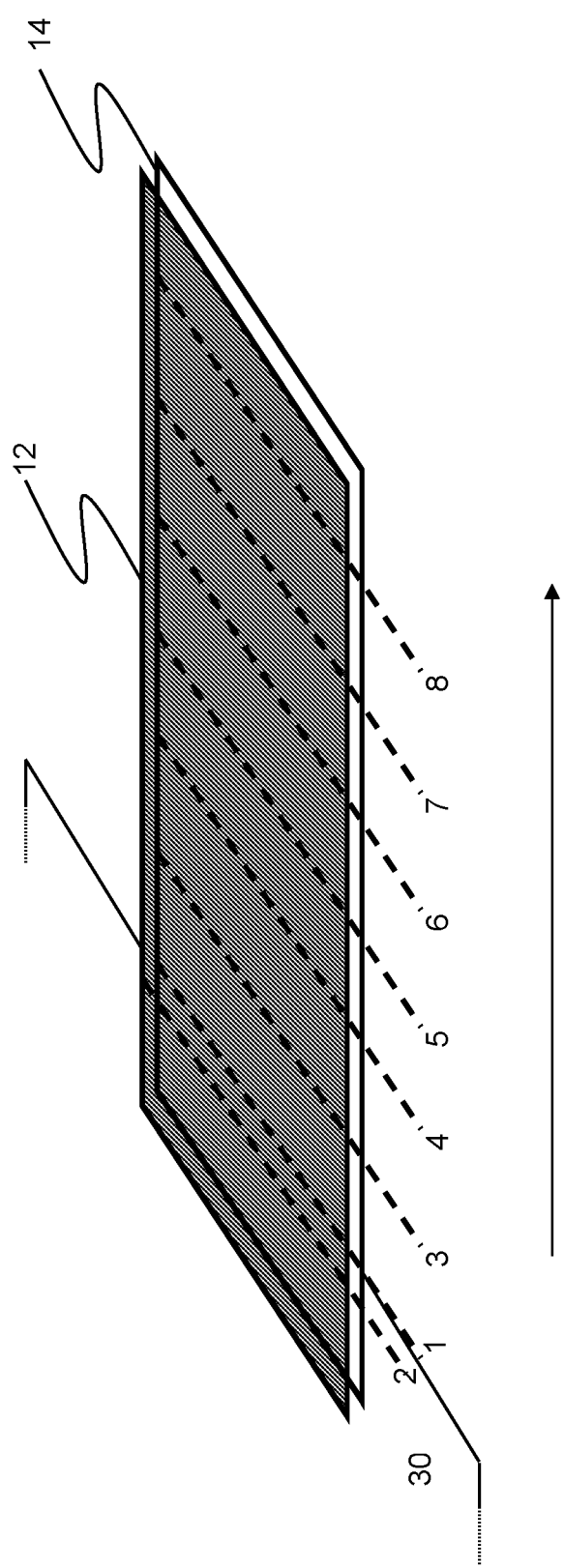
Figure 4:
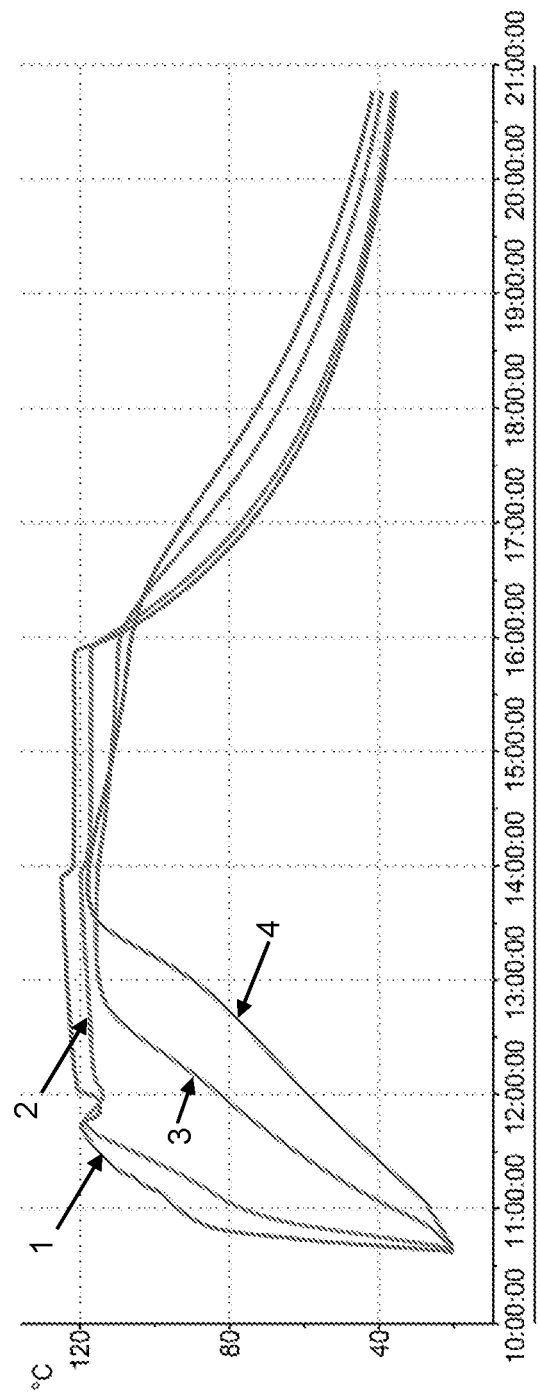
Figure 5:
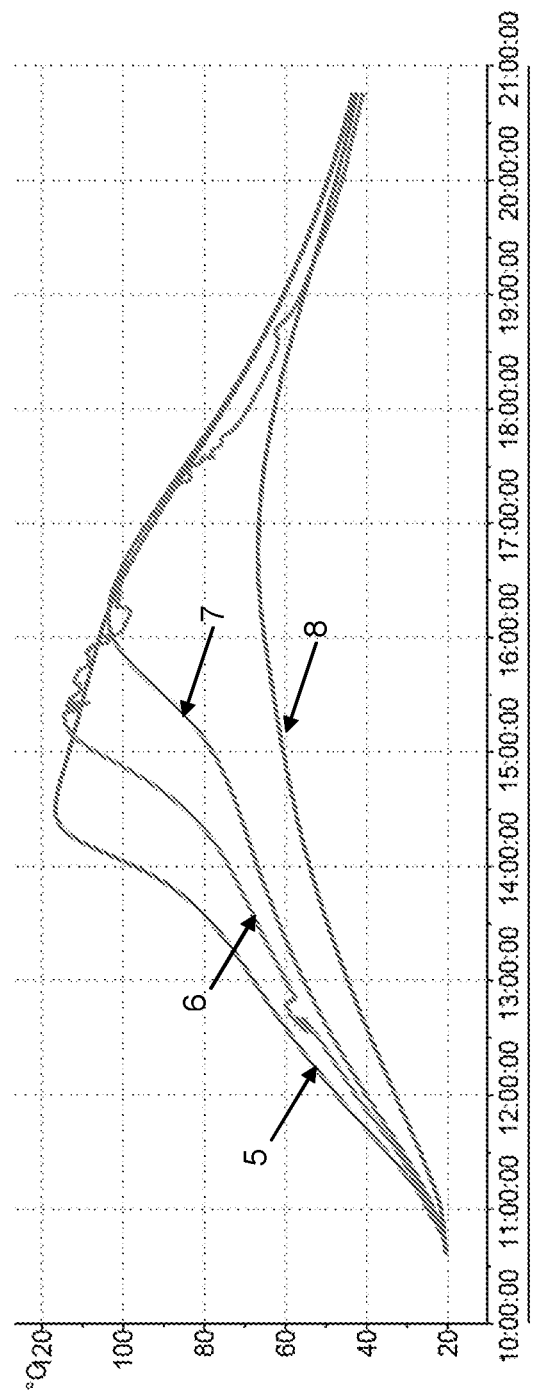

The invention will be described with reference to the enclosed schematic figures, in which:
 FIG. 1 shows a composite material according to the invention, and how it is heated,
 FIG. 2 shows a composite material as per FIG. 1, being a laminate,
 FIG. 3 illustrates the experimental set-up for Example 1,
 FIGS. 4 and 5 show the results from curing of Example 1.

DETAILED DISCLOSURE OF THE INVENTION

Specific Embodiments of the Invention

With reference to FIG. 1, the invention provides a method for curing of a composite material 10. A composite material 10 is first provided which comprises at least one layer 12, 14 of fibrous material and curable resin 20.

The fibrous material may comprise continuous or non-continuous (staple) fibres, or a combination thereof. The fibrous material may comprise natural fibres, mineral fibres or synthetic or semi-synthetic fibres, or a combination thereof. Most suitably, the fibrous material is selected from the group consisting of glass fibres, carbon fibres, aramid fibres, polyethylene fibres, natural fibres or combinations thereof. Of these, carbon fibres are most preferred as they have a low coefficient of thermal expansion.

The fibrous material is formed into a layer 12, 14. The layers of fibrous material may independently be layers of woven, nonwoven or unidirectional fibres. The layers 12, 14 may be individual tows of fibers.

At least one layer 12, 14 is used in the method of the invention, although—suitably—more than one layer 12, 14 is present (see FIG. 2). In such cases, the composite material 10 is a composite laminate 11 comprising at least two layers 12, 14 of fibrous material. If more than one layer 12, 14 is present, curing the resin acts to bind the layers together, as well as hardening the composite material 10.

In a preferred embodiment, at least one of said layers 12, 14 is of the fibrous material is at least partially pre-impregnated with said curable resin 20. In other words, at least one of said layers 12, 14 is a prepreg (a pre-manufactured resin-impregnated layer) in which all or most of the resin for the final laminate product is already present. Suitably, all layers 12, 14 of the composite material 10 are prepregs. Prepregs may optionally comprise one or multiple layers of fibre reinforcement such as wovens, non-wovens, fiber bundles etc, or may optionally comprise a number of impregnated tows (so-called tow-pregs). So-called "slit-pregs" are also known, manufactured from layered prepregs which are then slit into strips or tapes. The prepreg may comprise bundles or tows of fibres. In an embodiment of the invention, the fibre material of the prepreg comprises individual and aligned tows, and the prepreg comprises a towpreg and or a slitpreg. Alternatively, the fibres may be woven, non-woven, UD, braided or the like.

The prepregs may be completely or fully resin impregnated, or alternatively be semi-impregnated (semi-pregs), meaning that the prepreg comprises enough resin to embed all the fibres during curing, but that initially the resin is applied only to parts of the layer such as to one surface or in-between fibres leaving other parts resin free. Suitably, the prepreg may be a semi-preg where all the resin for a full impregnation is present but where the fiber material is not fully impregnated yet. The resin may for instance be applied to only the surface of a fiber layer. In one embodiment the prepreg may comprise a fully impregnated fiber layer and a completely or partly dry fiber layer adhered or stitched to each other. Alternatively or additionally, the prepreg may comprise resin-impregnated parts in between un-impregnated parts along its length, or bands of un-impregnated parts.

The composite material 10 comprises a curable resin 20. The resin may comprise an organic material selected from the group consisting of thermoplastic polymers or thermosetting polymers or combinations hereof. Thermosets may be preferred to thermoplastics systems as they provide more flexibility in the resin formulation as well as processing and provide also better stiffness and strength. The curable resin may be selected from the group consisting of epoxy, polyester, vinyl ester, polyimide, cyanate ester, phenolic and bismaleimide resins and blends thereof; preferably epoxy resin. The curable resin may be an adhesive resin or a matrix resin. Epoxy polymers and polyesters may be advantageous in providing good adhesive properties allowing for increased bonding to the fibres, high mechanical properties (especially stiffness and strength), improved resistance to fatigue and micro cracking, reduced degradation from water pickup, and increased resistance to osmosis (surface degradation due to water permeability).

The resin may further comprise fillers such as e.g. fumed silica which may advantageously provide shear thinning (i.e. low viscosity when the resin is under shear) thereby improving the resin impregnation.

Prior to—or during—the impregnation stage, one or more hardeners may additionally be added to the resin system to act as a curing agent. Further, other components may be added to the resin system such as accelerators to obtain curing at the desired temperatures. The hardeners and accelerators may be added to the resin system as dry parts (in powder form) or as liquid injectable parts e.g. if dispersed in a liquid carrier.

Upon application of heat, the curable resin 20 undergoes chemical bonding between the resin components (curing), which provides a hard, rigid structure. Typically, curable resins used in the present invention have a cure onset temperature, below which no curing takes place.

Heating the resin to a temperature above the cure onset temperature initiates curing. The cure onset temperature of the curable resin 20 is typically at least 70° C., preferably at least 80° C., more preferably at least 90° C. By selection of the resin and the components thereof, the skilled person will be able to tailor the cure onset temperature as required.

In the first step of the method according to the invention, heat is applied to only a first region 10' of said composite material 10. This is illustrated by the large arrow and the symbol Δ in FIGS. 1 and 2. Heat may be applied by the use of e.g. one or more heating pads, a heating wire, hot air and/or infrared lamps.

The first region 10' is heated to a temperature above the cure onset temperature of said curable resin 20. Curing of said curable resin 20 is therefore initiated in said first region 10'.

As the curing reaction is exothermic, heat is produced. As the composite material is thermally conductive, heat then spreads from the first region 10', as illustrated by the smaller arrows in FIGS. 1 and 2. The spread of heat causes a temperature rise in the surrounding composite material, to a temperature above the cure onset temperature. Curing of resin in regions of the composite material 10 outside of the first region 10' is then initiated. By maintaining the composite material (in particular, the regions outside of the first region 10') in an insulated state, the curing of said curable resin 20 spreads to regions of the composite material 10 outside of the first region 10'.

The curing spreads in a process analogous to a wildfire spreading through a forest—after sufficient initiation, the fire can spread from one end of the forest to the other.

An insulated state can be achieved by packing the composite material in an insulating material (e.g. expanded polystyrene), such that heat losses are minimised. Suitably, the composite material 10 is maintained in adiabatic conditions during spread of the curing; i.e. no energy transfer to the surroundings takes place. Suitably, in the method according to the invention, at least steps b. and c. are carried out in a vacuum.

Suitably, the curing of the curable resin 20 spreads from said first region 10' across the entirety of the composite material 10.

Depending on the nature of the resin and the fibrous material, and the external conditions under which curing takes place, it may be necessary to pre-heat the composite material in regions outside of the first region 10' to a temperature above ambient temperature, yet below the cure onset temperature. The thermal energy of the composite material is therefore raised, which improves the spread of the curing (as the rise in temperature which the exothermic curing reaction must provide in regions outside of the first region 10' is lower). Suitably, therefore the composite material 10 is pre-heating to a temperature of at least 40° C., preferably at least 50° C. during the curing.

Again, depending on curing conditions and the nature of the resin and the fibrous material, it may be desirable—after onset of curing at least in said first region 10'—to remove the heat from said first region 10'. This provides savings in energy use. Alternatively, the heat may be maintained, or simply reduced, in said first region 10' while curing spreads to regions outside of the first region 10'. This provides improved control over the curing (e.g. if curing slows down in regions of the composite material 10, additional heating may be applied).

As mentioned above, the method of the invention is particularly useful for relatively thick composite materials, in which high peak temperatures are commonly achieved due to poor dissipation of heat. Accordingly, the composite material used in the methods of the invention suitably has a thickness of at least 10 mm, preferably at least 25 mm, more preferably at least 50 mm.

The method described above may comprise part of an extended method for the manufacture of a formed article 100. The extended method would comprise steps a. b. and c. as set out above, and further comprise the step of moulding the composite material 10 according to the desired form of said formed article 100. Suitably, the composite material 10 is moulded prior to being heated in step a.

The method of the invention may be carried out as a continuous process or a batch process.

While preferred embodiments of the invention have been described, it should be understood that the invention is not so limited and modifications may be made without departing from the invention. The scope of the invention is defined by the appended claims, and all embodiments that fall within the meaning of the claims, either literally or by equivalence, are intended to be embraced therein.

Example 1

Adiabatic Hardening of 18 mm Thick Pre-Preg Slab

A layer of 18 mm thick carbon-fibre reinforced epoxy resin slab was provided, which comprised hardener and promoter such that its cure onset temperature was 75° C. The slab was provided with thermosensors 1-8 as illustrated schematically in FIG. 3. The slab was arranged such that one end overlapped a heated aluminium plate 30.

Thermosensors 1-8 were located as follows:
Sensor 1 is at the interface between carbon and aluminium plate
Sensor 2 is at the same location but 12 mm above
Sensor 3 is 40 mm to the right from 1 & 2
Sensor 4 is 80 mm from 1
Sensor 5 is 120 mm from 1
Sensor 6 is 160 mm from 1
Sensor 7 is 200 mm from 1
Sensor 8 is 280 mm from 1
Sensors 3-8 are also 12 mm up in the slab The slab is only in contact with the heated aluminium plate 30 at Sensors 1 and 2. The rest of the slab is insulated with a 5 mm white foam board. The aluminium plate is only heated by a heat to the left of the foam. The material was vacuum-bagged and covered with 100 mm PU foam for insulation.

The heat sensor measurements are shown in FIGS. 4 and 5. As can be seen, a "wave" of curing (indicated by the exotherm) progresses from the aluminium plate through sensors 1-8 in turn (in the direction indicated by the arrow in FIG. 3). Curing in the vertical plane can be seen by the delay in exotherm between sensors 1 and 2.

Note the heat was turned off at 15.50. Note also that the material at sensors 7 and 8 did not cure fully as the system is not fully adiabatic.

FIGS. 4 and 5 show evidence that latent composites can cure by their own energy in an adiabatic cure if properly ignited. The temperature rise is limited by the balance between enthalpy and heat capacity of the material. A temperature rise of approximately 100K is indicated as the material peak at 120° C. The heat appears to spread sideways at a rate of circa 50 mm/h.

CONCLUSIONS

The method shows significant potential for curing thick composite materials at low exothermic temperatures and at a controlled pace. The thicker the material, the better, as the process can be more adiabatic due to higher thermal mass versus heat losses.

The invention claimed is:

1. A method for curing of a composite material, said method comprising:
   a. providing a composite material comprising at least one layer of fibrous material and curable resin;
   b. applying heat to at least one first region of said composite material, such that said first region is heated to a temperature above the cure onset temperature of said curable resin, thus curing said curable resin in said first region;
   c. maintaining the composite material in an insulated state, such that the heat from the exothermic curing reaction in said first region acts to heat at least one uncured second region of the composite material to a temperature above the cure onset temperature of said curable resin in said at least one second region, such that the curing of said curable resin spreads from cured to uncured regions of the composite material at a temperature above the cure onset temperature.

2. The method according to claim 1, wherein the composite material is a composite laminate comprising at least two layers of fibrous material.

3. The method according to claim 1, wherein the composite material is maintained in adiabatic conditions during step (c).

4. The method according to claim 1, wherein the curing of the curable resin spreads from said first region across the entirety of the composite material.

5. The method according to claim 1, wherein the composite material is pre-heated to a temperature above ambient temperature, yet below the cure onset temperature of the curable resin, before step b.

6. The method according to claim 1, wherein—after onset of curing at least in said first region—the heat is removed from said first region.

7. The method according to claim 1, wherein at least one layer of the fibrous material is at least partially pre-impregnated with said curable resin.

8. The method according to claim 1, wherein the fibrous material is selected from the group consisting of glass fibres, carbon fibres, aramid fibres, polyethylene fibres, natural fibres or combinations thereof; preferably carbon fibres.

9. The method according to claim 1, wherein the curable resin is selected from the group consisting of epoxy, polyester, vinyl ester, polyimide, cyanate ester, phenolic and bismaleimide resins and blends thereof; preferably epoxy resin.

10. The method according to claim 1, wherein the curable resin is an adhesive resin or a matrix resin.

11. The method according to claim 1, wherein the composite material has a thickness of at least 10 mm.

12. The method according to claim 1, wherein at least steps b. and c. are carried out in a vacuum.

13. A method for the manufacture of a formed article, said method comprising steps a. b. and c. according to claim 1, said method further comprising the step of moulding the composite material according to the desired form of said formed article.

14. The method according to claim 1, where the method is used in manufacturing of a wind turbine blade.

15. The method according to claim 1, wherein the composite material has a thickness of at least 25 mm.

16. The method according to claim 1, wherein the composite material has a thickness of at least 50 mm.

* * * * *